June 24, 1924.
J. A. SMITH ET AL
TIRE REMOVER
Filed Oct. 29, 1920
1,498,816
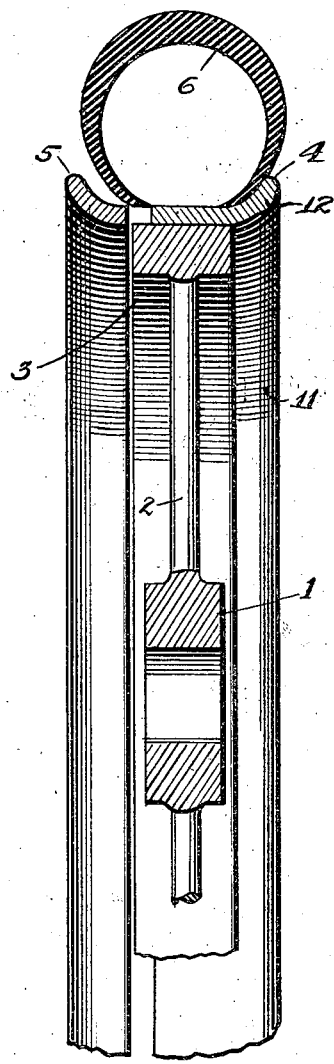
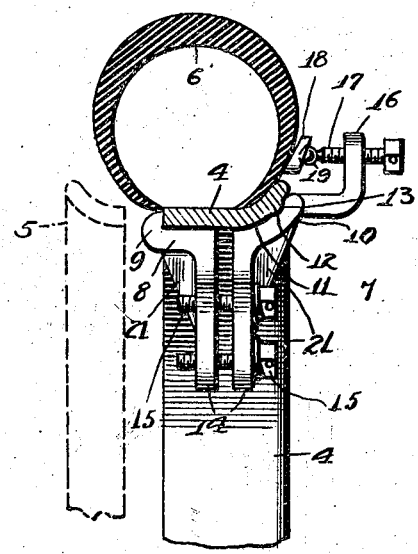
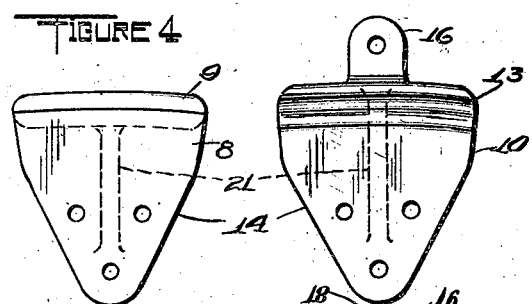
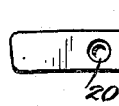
WITNESS
M. E. Lessin
INVENTOR
John A. Smith
Edward H. Stines
BY William F. Nickel
ATTORNEY Patented June 24, 1924.

1,498,816

UNITED STATES PATENT OFFICE.

JOHN A. SMITH AND EDWARD H. STINES, OF NEW BRUNSWICK, NEW JERSEY.

TIRE REMOVER.

Application filed October 29, 1920. Serial No. 420,518.

*To all whom it may concern:*

Be it known that we, JOHN A. SMITH and EDWARD H. STINES, citizens of the United States, residing in New Brunswick, in the county of Middlesex and State of New Jersey, have invented a new and useful Improvement in Tire Removers, of which the following is a specification.

Our invention relates to an improvement in tire-removers; particularly an appliance for removing rubber tires from the rims of wheels upon automobiles and trucks.

An object of the invention is to provide a device by which a rubber tire can easily be pried loose and quickly separated from the metal of the rim by which it is mounted upon a wheel, with a little labor and without risk of tearing the tire or otherwise inflicting damage upon either the tire or the rim holding it.

A further object of this invention is to provide an appliance which is simple in construction, and inexpensive to manufacture, which can readily be made to assume operative position with respect to a rim having a tire thereon and which requires the work of a moment only to be manipulated to give the desired result.

Other objects and advantages of the invention will appear from the following specification taken with the accompanying drawings, which disclose the best forms of our invention now known to us. This disclosure, however, is explanatory only; and we may change what is actually shown herein; especially as to details of shape, size and arrangement of the parts; without departing from the nature and spirit of the invention, as indicated by the broad and general meanings of the terms in which the appended claims are expressed.

On the drawings:—

Figure 1 is a view of a wheel for a truck or other vehicle having a rubber tire thereon;

Figure 2 is a side view of a tire-remover, according to our invention, in position to force the tire off the rim;

Figure 3 is an inside view of a jaw of said tire remover;

Figure 4 is a similar view of another jaw thereof;

Figure 5 is a front view of a thrust block in same; and

Figure 6 is a view similar to Figure 2 showing our invention in position to remove a tire from a different type of rim.

The same numerals identify the same parts throughout.

In Figure 1 we show at 1 the hub of the wheel of an automobile or truck; this wheel comprising spokes 2, which unite the hub to the felloe 3. Encircling this felloe is a rim comprising rings 4 and 5 by which the tire 6 is held on the wheel when the tire and the wheel are in service. Figure 1 shows the ring 4 upon the wheel with the tire encircling the same but with the ring 5 slightly separated. This mode of illustration is merely to indicate the manner in which the tire is separated from the rim; and not the manner in which the rim and tire are mounted upon the wheel; because when the tire is to be applied to the wheel the rim is assembled by making the two rings engage the opposite sides of the tire and secured together, and then the tire and the rim are placed on the wheel as a single unit. When the tire is to be taken off the wheel, the rim and the tire are removed together, but when the tire is to be separated from the rim, the tire and the ring 4 often adhere to each other. In other words, the ring 5 will come away easily enough; not requiring the use of tools of any sort. This condition is indicated by the space between the rings 4 and 5 in Figure 1. To complete the removal of the tire from the rim, the tire must be loosed and forced away from this ring 4.

The ring 4 and ring 5 are of the endless type; that is they are not cut through or provided anywhere in their circumference with abutting extremities; and the tire is first applied to one of these rings, such as the ring 4, which engages the tire on one side; the other ring 5 being applied to the tire on the opposite side, so that the inner ends of these two rings are in contact with each other. The tire and the ring can then be mounted upon the wheel, and bolts or any kind of fastening devices can be employed to hold the rim and felloe together. These fastening devices are not shown, but they are of well known construction and they permit removing the tire from the wheel whenever the tire has to be removed for repairs or because of other reasons. Of course the outer edges of each ring are shaped so that they engage the sides of the tire adjacent the inner edges thereof; and these rings may be designed for either tires with straight sides or tires of the clincher type, as will be understood.

When it is necessary to take off the tire held to a wheel by a rim of this description, the rim and the tire can be dismounted from the wheel easily enough, but if the tire requires repairs, the separation of the tire from the rim is not always easy, particularly after a long period of use in different kinds of weather. Under such conditions the tire is very apt to stick, the rubber of the tire uniting with the metal of the rim so as to become almost integral therewith, and much labor and effort involving the use of heavy tools may be required to force the tire and the rim apart. As stated, the ring 5 will come away comparatively easily, as indicated in Figure 1; also in broken lines in Figure 2; but the tire is very apt to stick tight to the ring 4. Our tire-remover is shaped to engage the ring 4 by gripping its opposite edges, and to engage the tire 6 so as to separate it from this ring.

The remover is indicated as a whole by the numeral 7. It comprises a jaw 8 terminating at one end in a tooth 9 and another jaw 10, so shaped on its inner face that it will fit the outer face of the ring 4 and hold it snugly. The outer face 11, of the ring 4 will be somewhat irregular but generally comprises a projection such as an annular rib 12 and the jaw 10 will have a transverse groove or recess 13 to receive this rib 12. Each of the jaws have projections 14 threaded to engage elements or tie bolts 15, and when the two jaws are applied to the opposite edges of the ring 4 and the bolts tightened the jaws grip the ring securely between them.

The jaw 10 has an extension 16 beyond the groove 13, beginning at the part where the groove is placed and this extension has an opening to receive a member or bolt 17. This bolt is adapted to cooperate with a member or block 18 which is intended to abut the side of the tire and force it away from the ring 4 when the bolt 17 engages the block. The bolt is provided with a head 19 to enter a recess 20.

In practice the jaws can be attached to the ring 4 after the tire and rim are taken off the wheel; and the ring 5 has been removed. The block 18 is disposed between the side of the tire and the bolt 17 and the latter turned up. The pressure thus supplied loosens the tire and forces it away from the ring 4. The operation can be performed at as many points around the circumference of the tire as may be required. In this way the tire is separated from the rim over its whole extent and can be removed with very little labor and in very short time.

This tire-remover is adapted for endless rims as above stated and not for split rims. It is seen to be quite simple in construction and capable of being applied and operated in a manner to give a desired result.

The jaws may be strengthened and reinforced by webs or ribs 21.

Figure 6 shows how our tire remover can be employed to remove tires from rims consisting of a main ring $4^a$, having an annular groove 22 on one side, for a locking ring, indicated at 23 and the tire remover comprises a jaw 8 as before, having a tooth 9 to engage the side of the ring $4^a$ containing the groove 22; and another jaw 10; and the outer face of the ring $4^a$ has an annular rib 12; and the jaw 10 contains a transverse groove or recess to receive this rib. The jaws 8 and 10 also have projections 14 for tie bolts 15; and on the jaw 10 is an extension 16 carrying the bolt 17 to force the block against the tire. In utilizing our tire remover for this type of rim, the jaws are made to grip the opposite sides of the ring $4^a$; with tooth 9 on the jaw 8 engaging one side and the jaw 10 engaging the opposite side so that the bolt 17 can apply the necessary degree of force to make the tire and the rim come apart.

Having described our invention, what we believe to be new and desire to secure and protect by Letters Patent of the United States, is:—

1. A tire remover comprising a pair of jaws, one of which has a tooth thereon and the other a recess, projections on said jaws, elements to engage the projections and secure said jaws together to make them grip the opposite edges of a ring constituting the main part of a rim to hold the tire upon a wheel, said ring having a projection to enter the recess, a thrust member carried by the jaw having said recess, and a block to be operated by said member to force the adjacent side of the tire out of engagement with the side of the rim and thus loosen the tire and enable it to be dismounted from the ring.

2. A tire remover comprising a pair of jaws, one of which has a tooth thereon and the other a recess, projections on said jaws, elements to engage the projections and secure said jaws together to make them grip the opposite edges of a ring constituting the main part of a rim to hold the tire upon a wheel, said ring having a projection to enter the recess, and a thrust member carried by the jaw having said recess to force the adjacent side of the tire out of engagement with the side of the rim and thus loosen the tire and enable it to be dismounted from the ring.

3. A tire rim remover comprising a pair of jaws, one of which has a tooth thereon and the other a transverse groove in same, each of said jaws having a projection, bolts to engage the said projections and secure the jaws together to make them grip the opposite edges of a ring constituting the main part of a rim to hold the tire upon a wheel, the ring having an annular rib on one side to enter said groove, and the jaw having the tooth engaging the opposite side, the jaw bearing the groove having an extension beyond the groove, said extension beginning adjacent said groove, a bolt having threaded engagement with the extension, and a thrust block cooperating with the bolt to force the adjacent side of the tire out of engagement with the side of the rim and thus loosen the tire and enable it to be dismounted from the ring.

In testimony whereof, we have signed our names to this specification this 20 day of September, 1920.

JOHN A. SMITH.
EDWARD H. STINES.